United States Patent
Lan et al.

(10) Patent No.: US 10,868,485 B2
(45) Date of Patent: Dec. 15, 2020

(54) CONSTANT TORQUE CONTROL METHOD FOR PERMANENT MAGNET SYNCHRONOUS MOTOR

(71) Applicant: Zhongshan Broad-Ocean Motor Co., Ltd., Zhongshan (CN)

(72) Inventors: Jinghao Lan, Zhongshan (CN); Wenqing Bian, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 0 days.

(21) Appl. No.: 16/584,915

(22) Filed: Sep. 26, 2019

(65) Prior Publication Data

US 2020/0153373 A1 May 14, 2020

(30) Foreign Application Priority Data

Nov. 10, 2018 (CN) .......................... 2018 1 1334775

(51) Int. Cl.
*F04B 47/02* (2006.01)
*H02P 21/06* (2016.01)
*H02P 6/08* (2016.01)

(52) U.S. Cl.
CPC ................ *H02P 21/06* (2013.01); *H02P 6/08* (2013.01)

(58) Field of Classification Search
CPC ............. H02P 21/06; H02P 6/08; F04B 47/02
See application file for complete search history.

(56) References Cited

U.S. PATENT DOCUMENTS

| 6,414,455 | B1 * | 7/2002 | Watson | ............ F04B 47/02 318/432 |
| 7,525,269 | B2 | 4/2009 | Patel et al. | |

FOREIGN PATENT DOCUMENTS

CN          103929109 A          7/2014

* cited by examiner

*Primary Examiner* — Cortez M Cook
(74) *Attorney, Agent, or Firm* — Matthias Scholl P.C.; Matthias Scholl

(57) ABSTRACT

A constant torque control method for a permanent magnet synchronous motor. The method includes: 1) starting a motor; setting a torque T of the motor; calculating a given current iq_limit on a q-axis based on the torque T; setting a target current iq_A on the q-axis to be equal to the given current iq_limit; and allowing the motor to operate in a constant torque control mode by a current-based proportional integral (PI) controller on the q-axis; 2) presetting a reference speed Vref1 of the motor; measuring a real-time speed V of the motor; when the real-time speed V is less than the reference speed Vref1, increasing an extra current delta_iq to the given current iq_limit to intervene the real-time speed V of the motor; and 3) measuring the real-time speed V of the motor; and calculating a speed difference Err=V−Vref2.

9 Claims, 15 Drawing Sheets

CONSTANT TORQUE CONTROL METHOD FOR PERMANENT MAGNET SYNCHRONOUS MOTOR

CROSS-REFERENCE TO RELATED APPLICATIONS

Pursuant to 35 U.S.C. § 119 and the Paris Convention Treaty, this application claims foreign priority to Chinese Patent Application No. 201811334775.7 filed Nov. 10, 2018, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

The disclosure relates to a constant torque control method for a permanent magnet synchronous motor based on position sensorless vector control.

Conventionally, the control method of a position sensorless permanent magnet synchronous motor includes a constant torque control mode, a constant speed control mode and a constant air volume control mode.

FIG. 1 shows a block diagram of a conventional constant torque control mode. According to the formula $T=K \times iq0$ where K is a coefficient, preset a torque T, and then the input current iq0 on the q-axis can be calculated. The torque is merely related to the input current. Thus, the constant torque control can be achieved through a current-based proportional integral controller on the q-axis.

However, in the conventional constant torque control mode, the rotation speed of the motor cannot be compensated. When the preset value of the torque is smaller or the load becomes heavier than expected, the relatively low rotation speed will make the motor work in an unstable state and produce much noise.

SUMMARY

The disclosure provides a constant torque control method for a permanent magnet synchronous motor. The method can compensate the rotation speed of the motor as needed.

Provided is a constant torque control method for a permanent magnet synchronous motor, the method comprising:

1) starting a motor, setting a torque T of the motor, calculating a given current iq_limit on a q-axis based on the torque T, setting a target current iq_A on the q-axis to be equal to the given current iq_limit, and allowing the motor to operate in a constant torque control mode by a current-based proportional integral (PI) controller on the q-axis;
2) presetting a reference speed Vref1 of the motor, measuring a real-time speed V of the motor, when the real-time speed V is less than the reference speed Vref1, increasing an extra current delta_iq to the given current iq_limit to intervene the real-time speed V of the motor, so that the motor withdraws from the constant torque control mode and enters a constant speed control mode with a target speed Vref2; and
3) measuring the real-time speed V of the motor, calculating a speed difference Err=V−Vref2, when the speed difference Err is greater than a given value E0, allowing the motor to withdraw from the constant speed control mode and return to the constant torque control mode in 1).

The reference speed Vref1=the target speed Vref2 or Vref1<Vref2.

The given current iq_limit on the q-axis is calculated according to a formula $T=K \times iq\_limit$, where T is the preset torque of the motor, and K is a coefficient.

The constant speed control mode is maintained by a speed-based PI controller disposed outside the current-based PI controller on the q-axis.

When the speed difference Err is negative, the speed-based PI controller constantly acquires the extra current delta_iq of the q-axis; in the constant speed control mode, the target current iq_A is a sum of the given current iq_limit and a plurality of extra currents delta_iq of the q-axis.

Whether or not the speed-based PI controller quits a working mode is determined by the speed difference Err; when the speed difference Err is larger than a preset value $E_0$ which is greater than 0, the speed-based PI controller quits the working mode.

The real-time speed V is measured by a speed observer; a signal corresponding to the real-time speed V is processed by average filtering and recursive filtering to inhibit a speed fluctuation.

The reference speed Vref1 is acquired by a plurality of experiments.

The response time t1 of the speed-based proportional integral controller is less than the response time t2 of the current-based proportional integral controller; the response time t1 of the speed-based proportional integral controller is determined by a rotational inertia of a load connected to the motor, and the response time t1 of the speed-based proportional integral controller is proportional to the rotational inertia of the load.

Advantages of the constant torque control method for a permanent magnet synchronous motor according to embodiments of the disclosure are summarized as follows: 1) The method presets a reference speed Vref1, so that when the load is increased and the command value of the torque is smaller than expected, the actual speed V can be compensated. This ensures the stable operation of the motor, and reduces the vibration and noise. 2) When the difference Err between the real-time speed V and the set target speed Vref2 is a negative number, an extra current delta_iq is added to the given current iq_limit. The target current iq_A on the q-axis is equal to the sum of the given current iq_limit and a plurality of extra currents delta_iq on the q-axis. This ensures the current on the q-axis is greater than the given current iq_limit so that the torque will not decrease. The motor operates steadily and smoothly between the constant speed control mode and the constant torque control mode, producing almost no vibration and noise.

DETAILED DESCRIPTION

To further illustrate, examples detailing a constant torque control method for a permanent magnet synchronous motor are described below. It should be noted that the following examples are intended to describe and not to limit the description.

Figure 3:
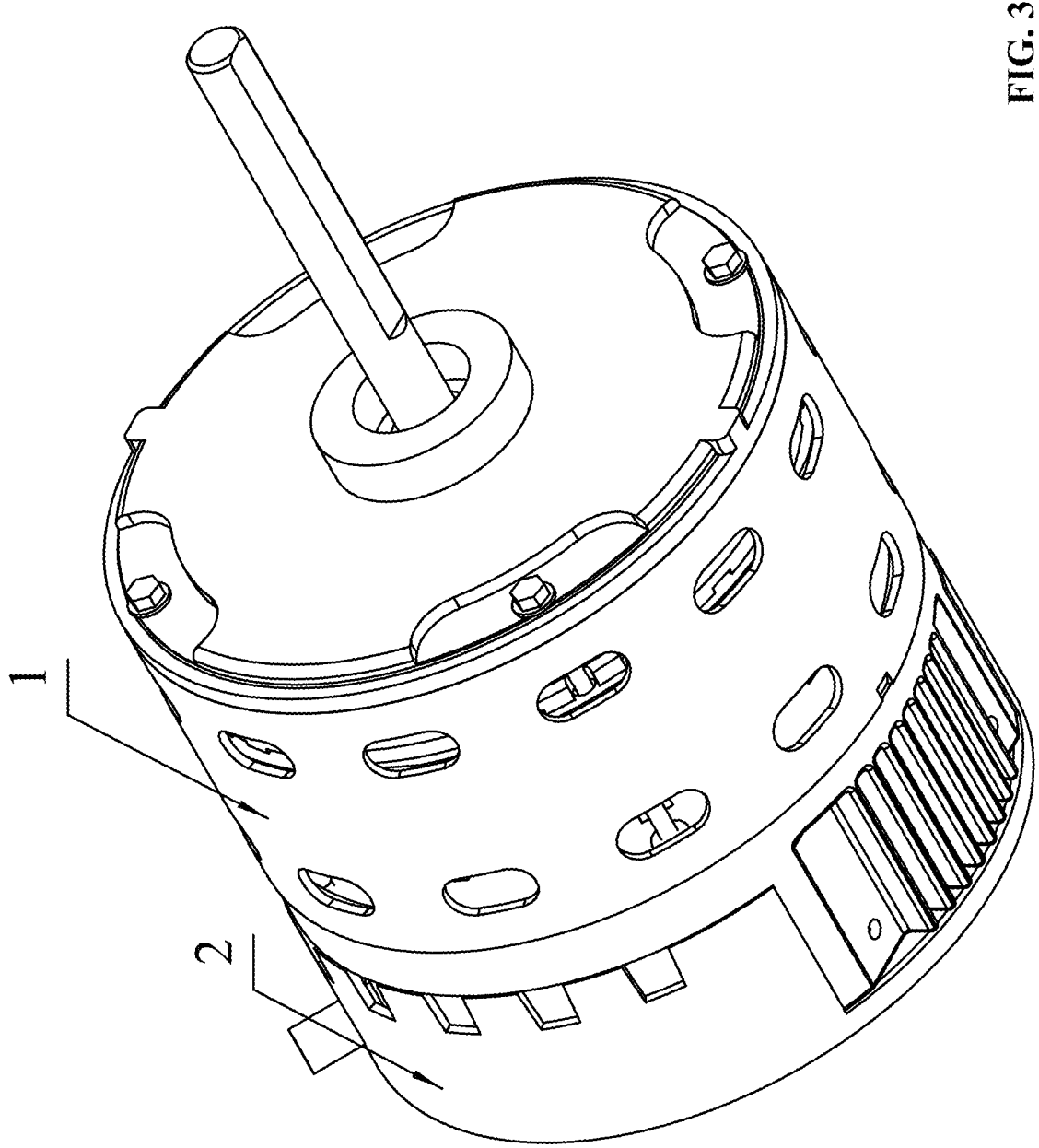
FIG. 3 is a perspective view of a permanent magnet synchronous motor according to one embodiment of the disclosure.
Figure 4:
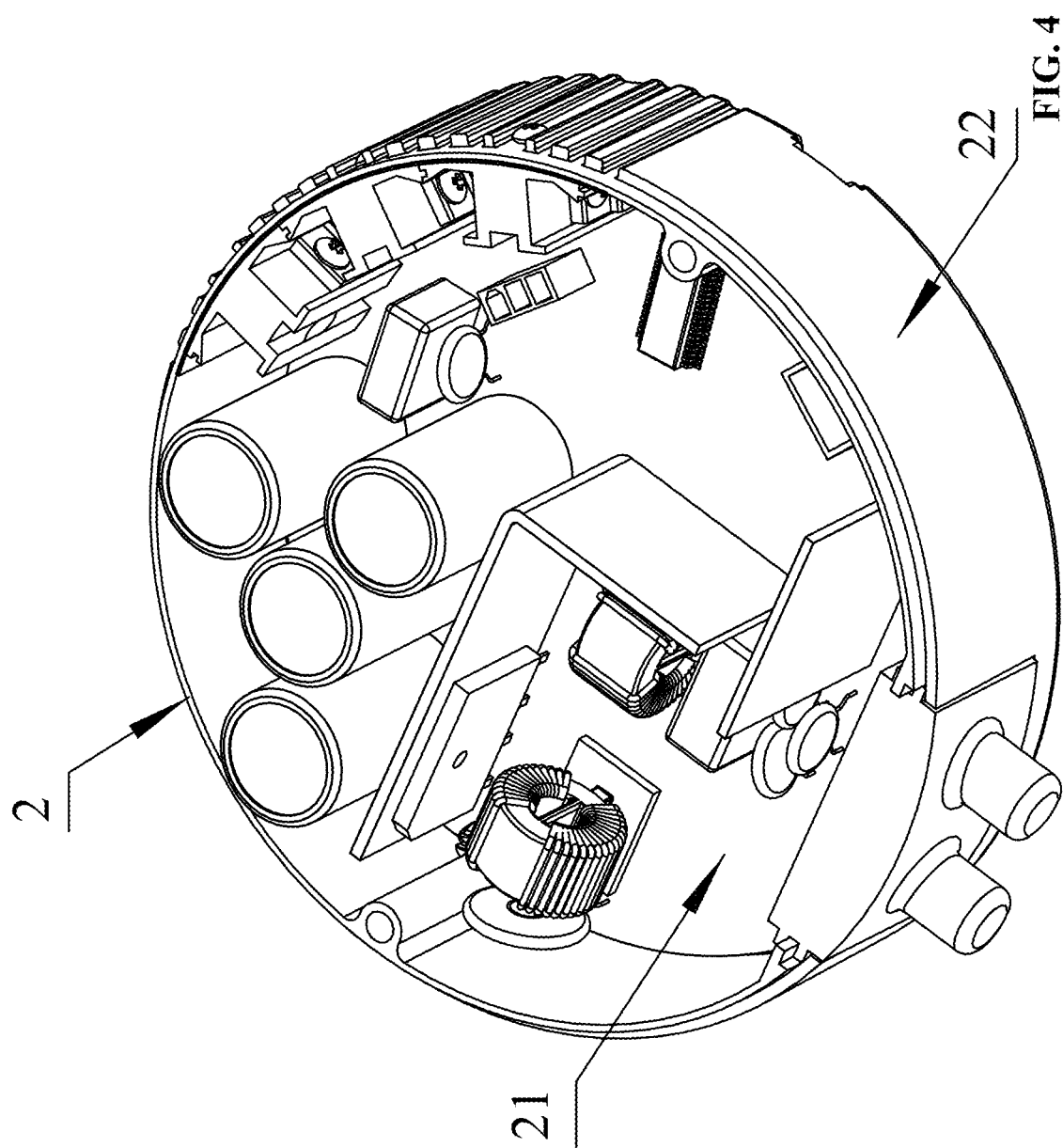
FIG. 4 is a perspective view of a motor controller of a permanent magnet synchronous motor according to one embodiment of the disclosure.
Figure 5:
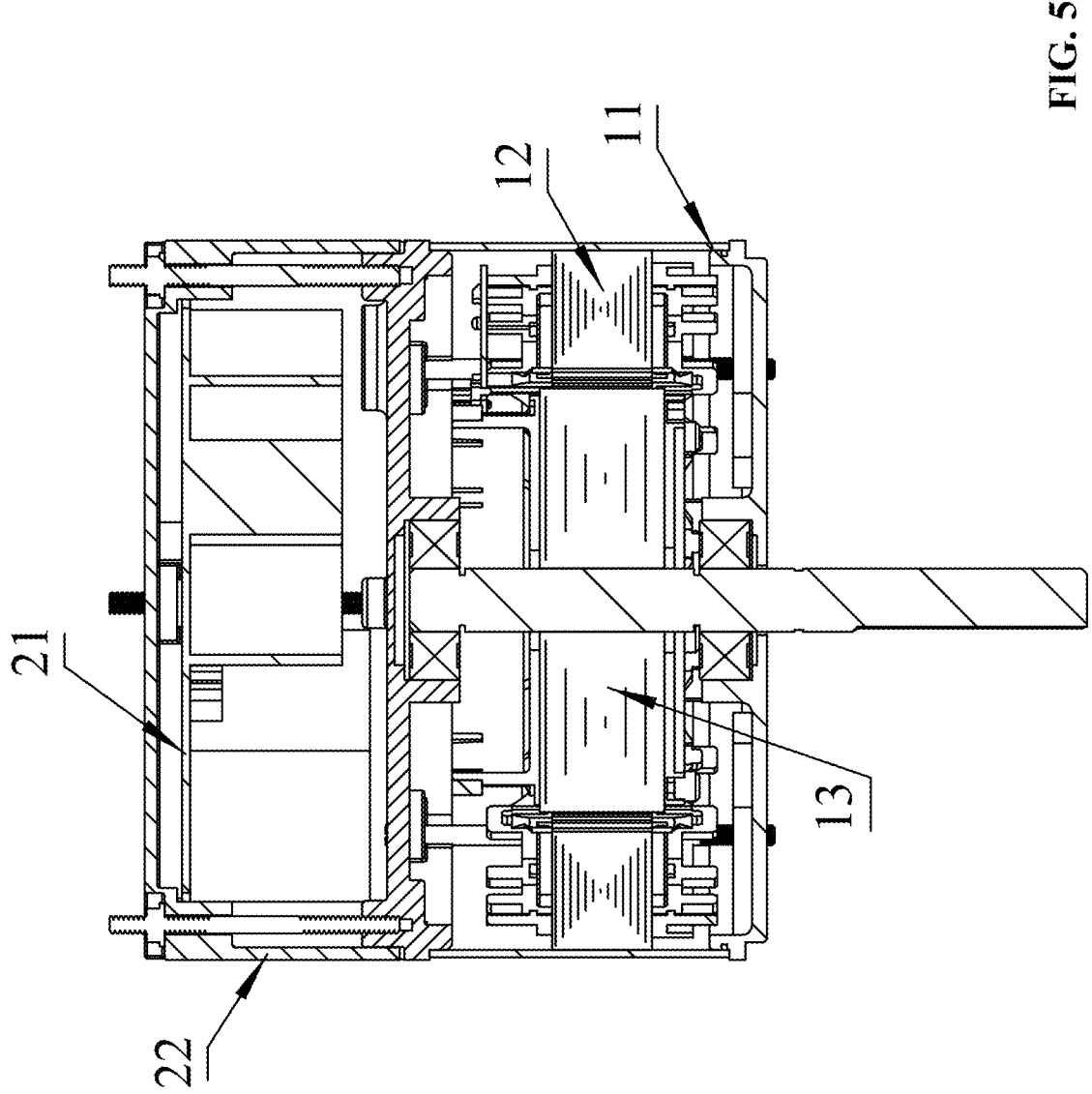
FIG. 5 is a cross-sectional view of a permanent magnet synchronous motor according to one embodiment of the disclosure.

As shown in FIG. 3, FIG. 4 and FIG. 5, provided is a three-phase permanent magnet synchronous motor comprising a motor unit 1 and a motor controller 2. The motor unit 1 comprised a stator assembly 12, a rotor assembly 13 and a housing assembly 11; the stator assembly 12 was mounted on the housing assembly 11; the rotor assembly 13 was nested in or outside the stator assembly 12; the motor controller 2 comprised a control box 22 and a control circuit board 21 mounted therein; the control circuit board 21 comprised a power circuit, a microprocessor, a bus voltage sensing circuit, and an inverter; the power supply circuit supplied power to each part of the circuit. The DC bus voltage Uabc was input to the microprocessor by the bus voltage detection circuit; the microprocessor controlled the inverter which controls the on and off of the coil windings in each phase of the stator assembly 12.

Figure 6:
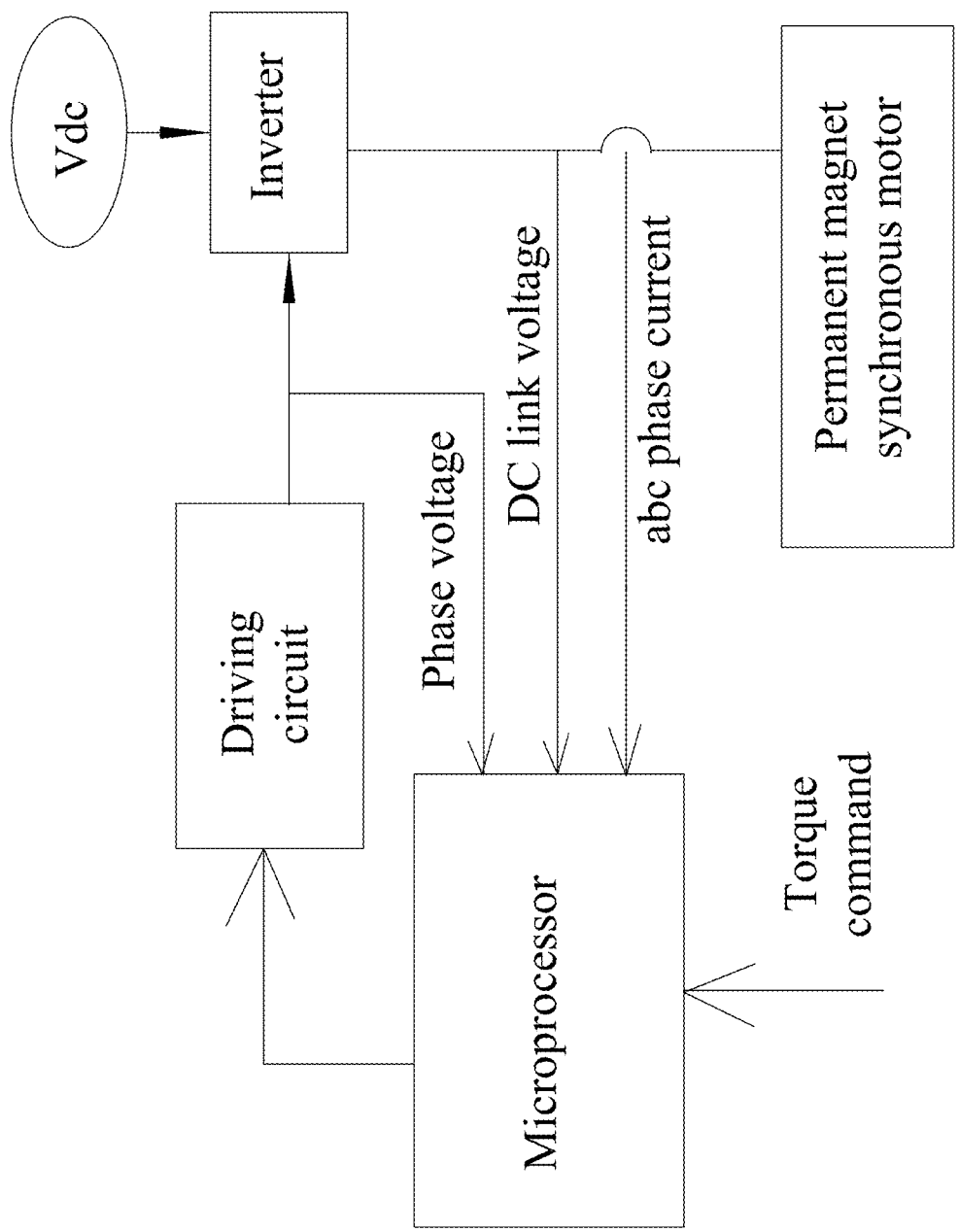
FIG. 6 is a block diagram of a motor controller of a permanent magnet synchronous motor according to one embodiment of the disclosure.
Figure 7:
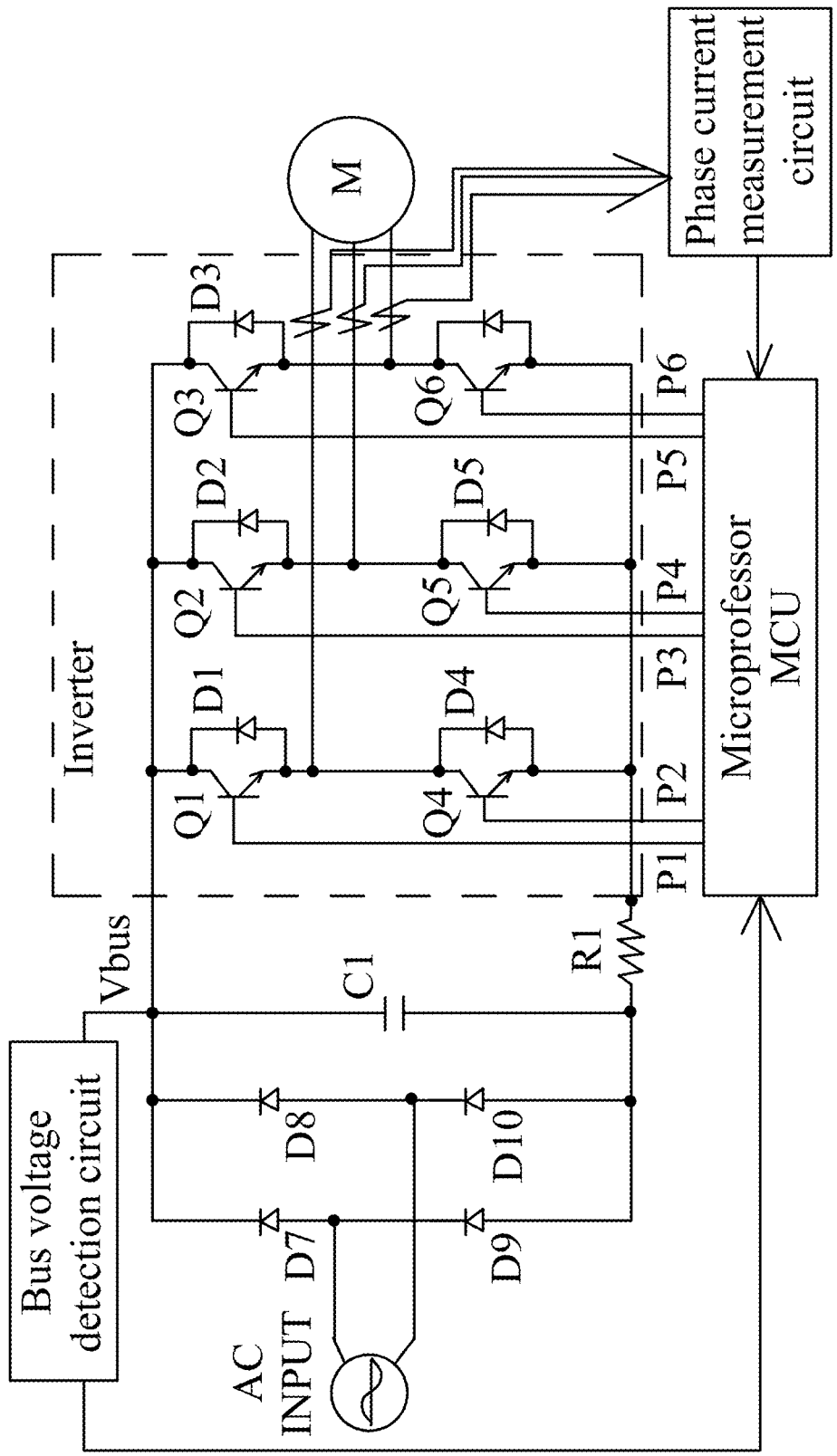
FIG. 7 is a circuit diagram corresponding to FIG. 6.

As shown in FIG. 6 and FIG. 7, supposed that the line current sensing circuit of the three-phase permanent magnet brushless DC motor input the phase currents ia, ib, and ic to the microprocessor. Then the DC bus voltage Vbus was output from one end of the capacitor C1 after the AC INPUT passed through the full-wave rectification circuit consisting of diodes D7, D8, D9, and D10, wherein the DC bus voltage Vbus was related to the input AC voltage. Six PWM signals (P1, P2, P3, P4, P5, P6) were calculated by a microprocessor and then input into an inverter through six electronic switch tubes (Q1, Q2, Q3, Q4, Q5, Q6) on the inverter, respectively.

Figure 1:
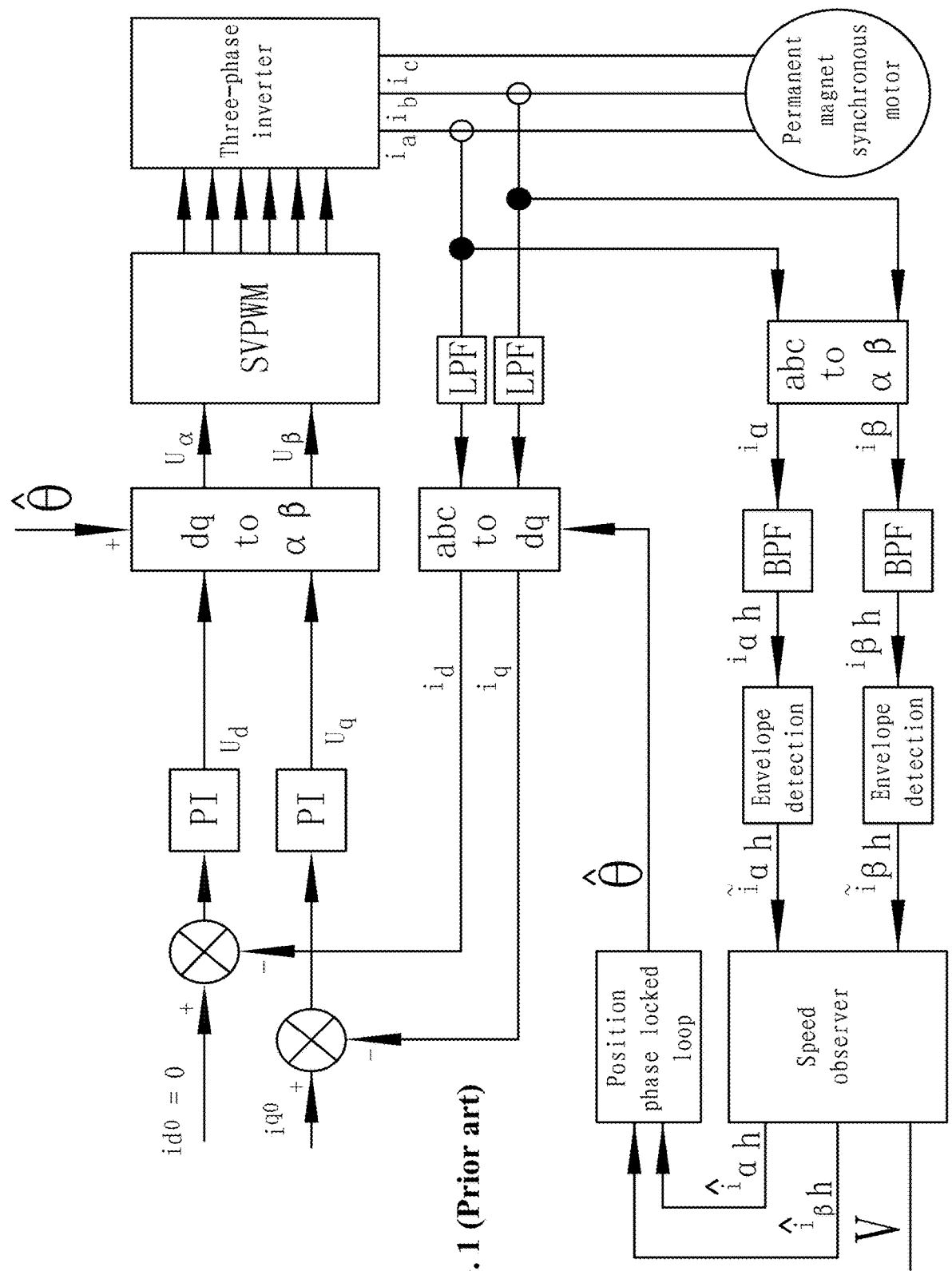
FIG. 1 is a control flow diagram of a constant torque control method of a permanent magnet synchronous motor in the related art.
Figure 2:
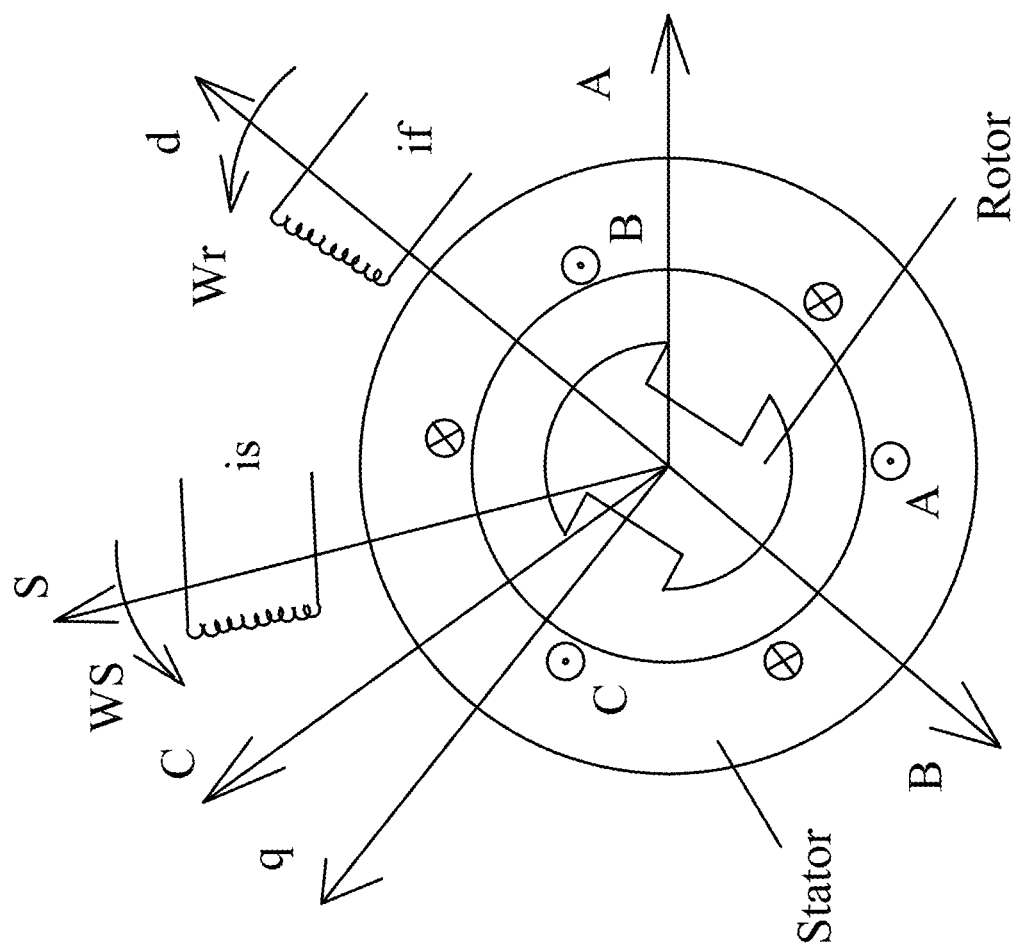
FIG. 2 is a principle diagram showing vector control of a position sensorless permanent magnet synchronous motor according to one embodiment of the disclosure.

As shown in FIG. 2, the basic working principle of a permanent magnet synchronous motor based on position sensorless vector control was briefly described as follows: the permanent magnet synchronous motor was regarded as the interaction effects of rotating magnetic field between a stator and a rotor. There were two coordinate systems in the figure, one was a rotating coordinate system—DQ coordinate system, the other was a stationary coordinate system—ABC coordinate system (which can be converted into a coordinate system where α and β were perpendicular to each other). The rotor rotated at a rotational speed wr under the action of the excitation current if, and the stator rotated at a rotational speed ws under the action of the excitation current is, the resultant vector of the stator in the figure was S; according to the formula of electromagnetic torque:

$$T_e = P_0 \cdot \varphi_f \times i_q \tag{1}$$

where $P_0$ was a pole pair (constant) of the motor, $\Psi_f$ was a flux linkage generated under the action of the field current if. Based on the rotor was a permanent magnet rotor, when if=0 and $\Psi_f$ was a constant, the formula of electromagnetic torque became:

$$T_e = K \times i_q \tag{2}$$

where K was a constant, and the electromagnetic torque Te of the permanent magnet synchronous motor was only determined by q-axis current.

Figure 8:
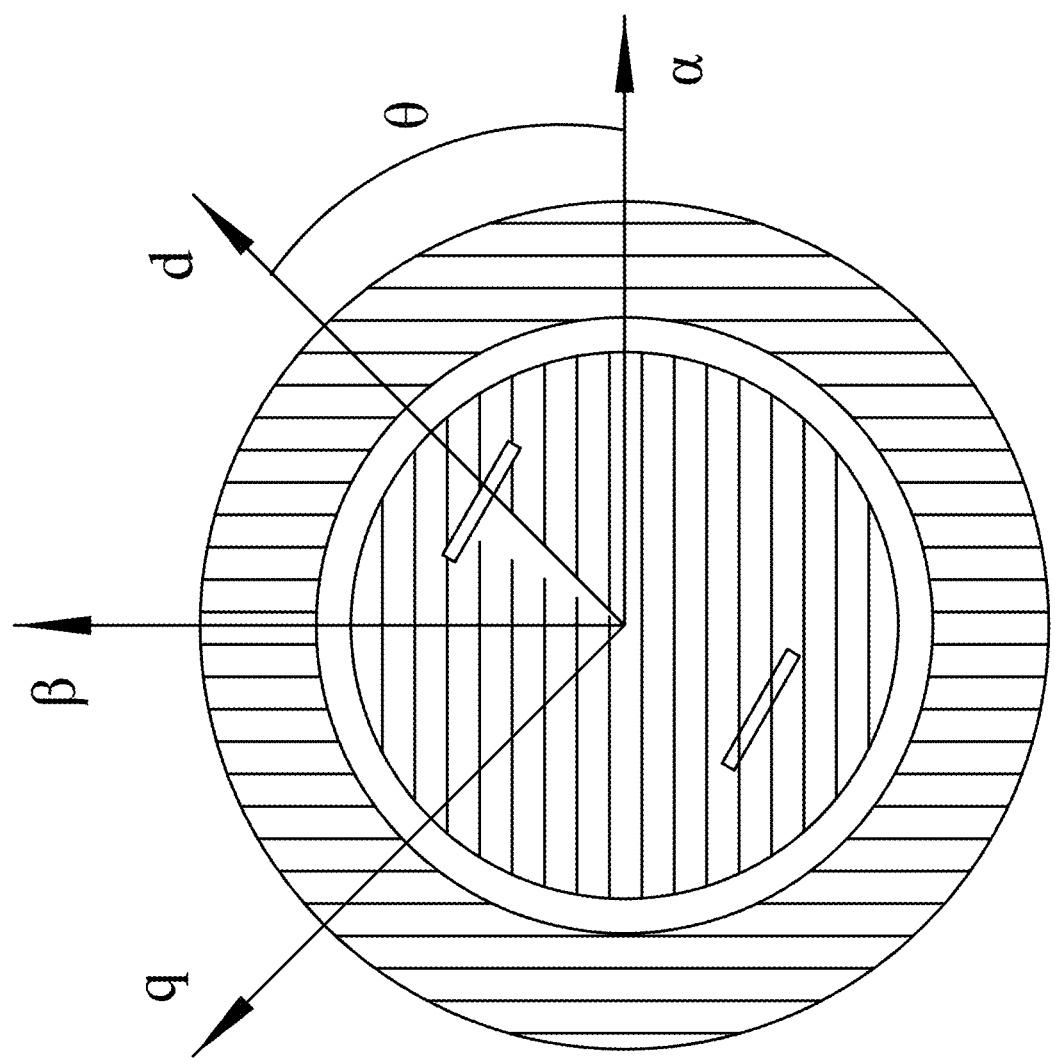
FIG. 8 is a diagram showing a coordinate system of the vector control for a permanent magnet synchronous motor.
Figure 9:
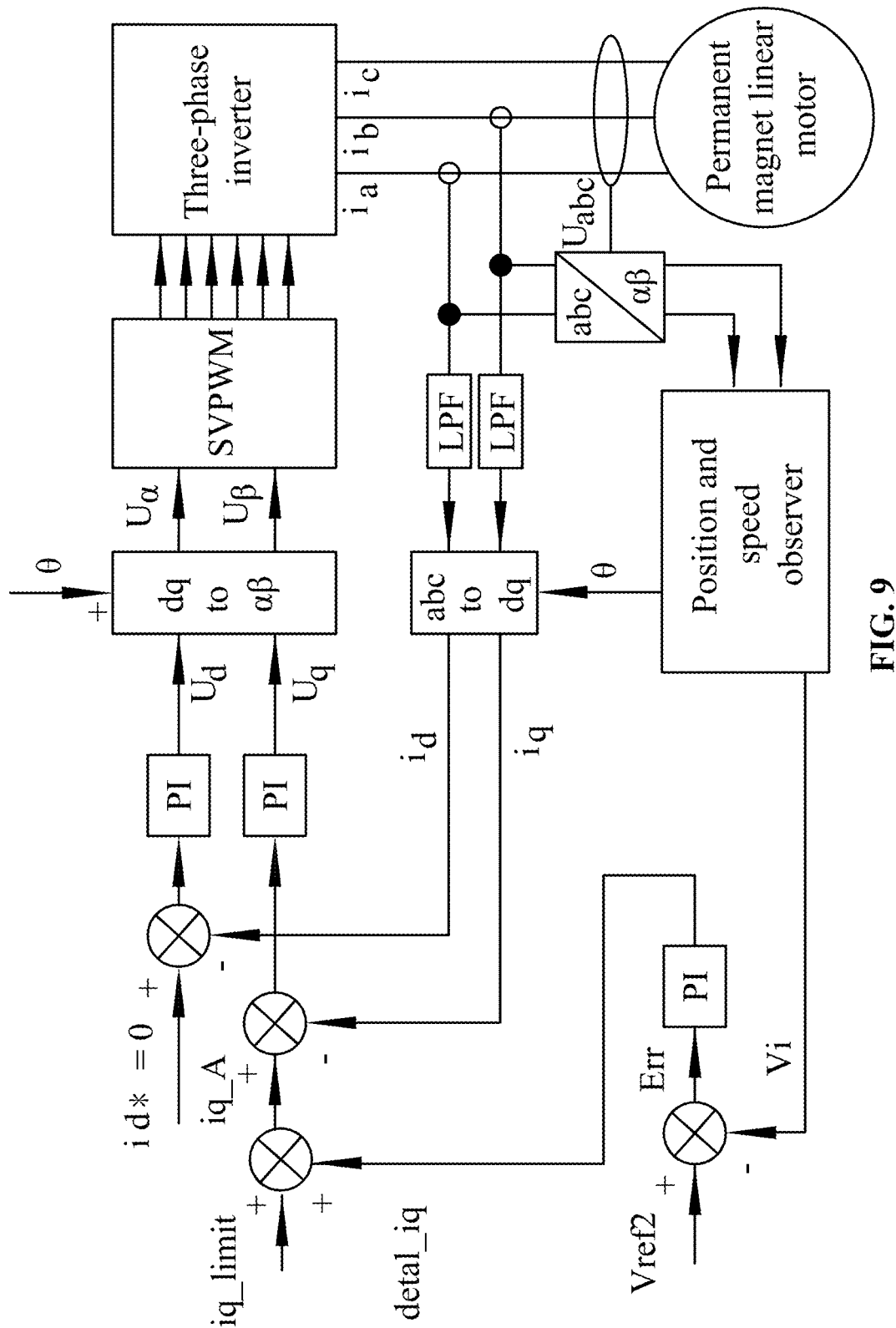
FIG. 9 is a control flow diagram of a permanent magnet synchronous motor according to one embodiment of the disclosure.
Figure 10:
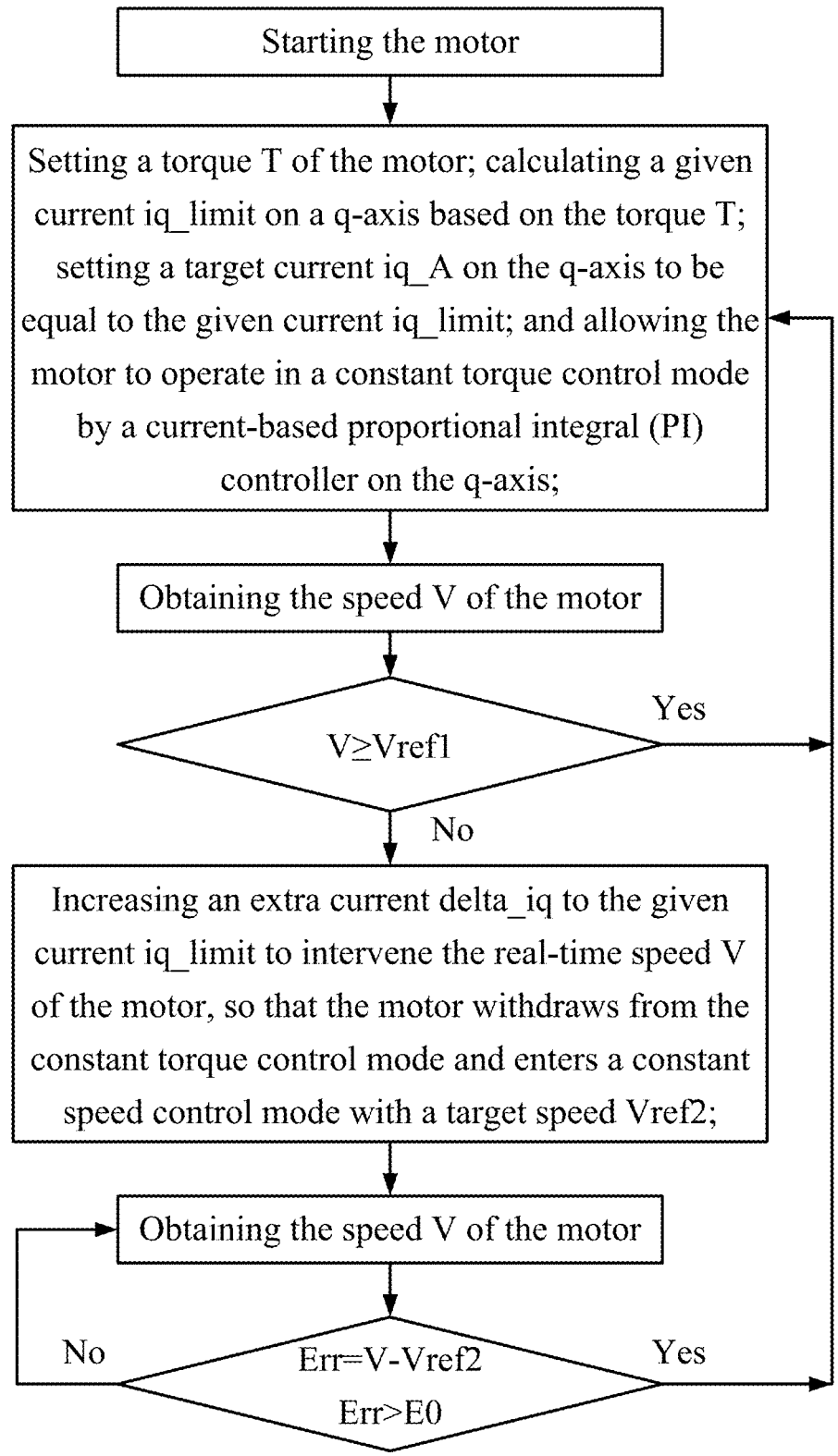
FIG. 10 is a flowchart illustrating constant torque control method for a permanent magnet synchronous motor according to one embodiment of the disclosure.
Figure 11:
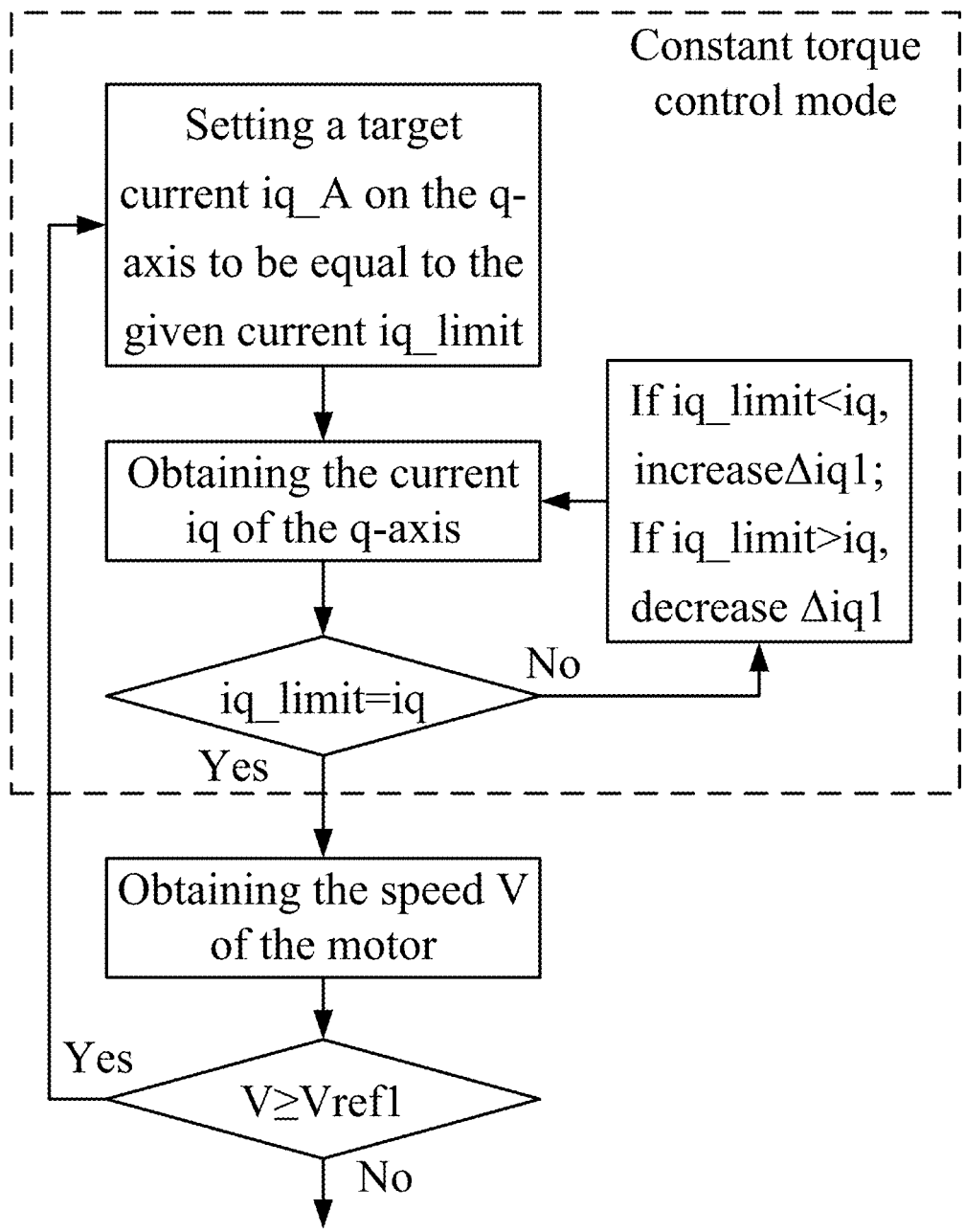
FIG. 11 is a flowchart showing a constant torque control in FIG. 10.

As shown in FIG. 8, the stationary coordinate system of the stator—ABC coordinate system was replaced by an αβ coordinate system in which α and β were perpendicular to each other, and the rotation coordinate system of the rotor was a dq coordinate system, in which θ was the angle between αβ coordinate system and dq coordinate system.

As shown in FIG. 9, FIG. 10, FIG. 11, and FIG. 12, a constant torque control method for a permanent magnet synchronous motor based on position sensorless vector control comprised the following steps:

1) starting a motor, setting a torque T of the motor, calculating a given current iq_limit on a q-axis based on the torque T, setting a target current iq_A on the q-axis to be equal to the given current iq_limit, and allowing the motor to operate in a constant torque control mode by a current-based proportional integral controller on the q-axis;

2) presetting a reference speed Vref1 of the motor, measuring a real-time speed V of the motor, when the real-time speed V is less than the reference speed Vref1, increasing an extra current delta_iq to the given current iq_limit to intervene the real-time speed V of the motor, so that the motor withdraws from the constant torque control mode and enters a constant speed control mode with a target speed Vref2; and 3) measuring the real-time speed V of the motor, calculating a speed difference Err=V−Vref2, when the speed difference Err is greater than a given value $E_0$, allowing the motor to withdraw from the constant speed control mode and return to the constant torque control mode in 1).

Vref2, the target speed during the constant speed control process, was greater than or equal to the reference speed Vref1. Example 1: The preset reference speed Vref1=Vref2=600 rpm, E0=20 rpm; Example 2: The preset reference speed Vref1=600 rpm, Vref2=590 rpm; E0=40 rpm. Example 3: Reference speed Vref1=600 rpm, Vref2=630 rpm; E0=30 rpm, all of the three examples were implementable.

When the difference Err (Err=V−Vref2) was a negative number, the speed-based PI controller constantly acquired the extra current delta_iq on the q-axis in real time; in the constant speed control mode, the target current iq_A was a sum of the given current iq_limit and a plurality of extra currents delta_iq on the q-axis.

Whether or not the speed-based PI controller quitted a working mode was determined by the speed difference Err; when the speed difference Err was larger than a preset value $E_0$ which was greater than 0, the speed-based PI controller quitted the working mode. Delta_iq was obtained by integrating the speed difference ERR.

Whether or not the speed-based PI controller quitted a working mode was determined by the speed difference ERR (ERR=V 1-V), when the speed difference Err was greater than or equal to zero, the speed-based PI controller accessed the working mode and the current increment delta_iq on the q-axis was not zero; when speed difference ERR was less than or equal to zero, the speed-based PI controller quitted the working mode and the current increment delta_iq on the q-axis was zero, which was equivalent to entering the mode of constant torque control.

For example, a conventional fan was driven by a motor set to a constant torque control mode. The torque T set by users was converted to a given current iq_limit of the q-axis, wherein the given current iq_limit was equal to the target current iq_A, which accessed the constant torque control mode by using the speed-based PI controller on the q-axis;

The speed decreased when the external static pressure suddenly increases dramatically (equal to the load increment). If the real-time speed V was less than the preset reference speed Vref1 (e.g. 900 rpm), the device would quit the constant torque control mode and enter the constant speed control mode; the given current iq_limit was increased by the current increment delta_iq to change the speed, so that the motor performed constant speed control mode keeping a speed at 900 rpm; when the external static pressure returned to a normal state, the real-time speed V rise to a stable state (e.g. Vref2=920 rpm), the device quitted the constant speed control mode and returns to 1) for accessing the constant torque control mode.

The working principle of this motor was as follows:

A speed-based PI controller was added to the constant torque control strategy. The input of the speed-based PI controller was the speed difference Err (V−Vref2), the output of the speed-based PI controller was a sum of given current iq_limit of the q-axis and extra currents delta_iq. In the constant torque control mode, the extra currents delta_iq output by the speed-based PI controller was zero, which was equal to the constant torque control mode without the speed controller, at which time the target current iq_A output from the q-axis was equal to the given current iq_limit that was the torque command value sent by users. While a current control strategy was to add a speed-based PI controller based on the control strategy for constant torque. The output of the speed-based PI controller was a sum of the given current iq_limit and a plurality of extra current delta_iq. When the given current iq_limit was capable of driving the load to run at a speed higher than Vref1, the speed-based PI controller would quit the working mode if the speed difference Err was larger than a given value E0 (a positive number), and the extra currents delta_iq was zero, which was equivalent to accessing the constant torque control mode; the speed would slowly decrease if the given current iq_limit was difficult to drive the load. The speed-based PI controller worked as long as the speed difference Err was negative, the extra current delta_iq being output adjusted the target current iq_A of the q-axis, so that the target current iq_A=iq_limit+delta_iq of the q-axis was capable of driving the load within the speed range of Vref2; at which time iq_A was increased or the load was reduced, the extra current delta_iq decreases slowly; when delta_iq was zero, the speed was Vref2, after which iq_A was increased or the load was continually reduced, until the speed V was higher than a certain value, leading to the constant torque control mode instead of running the speed-based PI controller.

The real-time speed V was estimated by a speed observer and a signal corresponding to the real-time speed V was processed by average filtering and recursive filtering, which inhibited a speed fluctuation in a small range without affecting the response speed.

Using the speed-based PI controller, rapidly adjusting the extra current delta_iq to ensure that the speed difference Err tends to be zero and the speed fluctuation was slight. This method was capable of adjusting rapidly the speed to a steady state during the load (speed V) fluctuations and maintaining a peaceful transition between the input and output of extra current, which basically solved all the shortcomings of the conventional control strategy.

The control strategy had the following critical points:

1. Processing of a speed feedback signal:

Speed was a very important electrical parameter for a vector control without position sensor. In the constant torque mode, an unstable speed would cause the instability of torque. Thus, a speed feedback signal must be processed to ensure that the speed feedback signal was stable without affecting the response speed. At present, the speed signal was processed by average filtering and recursive filtering to inhibit a speed fluctuation in a small range without affecting the response speed, which basically meet the control requirements.

2. Selection of control speed and control parameters for the speed-based PI controller:

The extra current delta_iq output by the speed-based PI controller was required to real-time response to the current-based PI controller of inner loop, but it was necessary to reconcile the demand of response speed and inner loop (current-based PI controller) speed, and the speed-based PI controller cannot run too fast. However, oscillation of the device would be caused because the speed-based PI controller run too slowly or technicians ignored the timely adjustment on this problem. In addition, different load characteristics had different execution speeds.

The analysis assumed that the greater the moment of inertia of the load, the slower the response speed of the speed-based PI controller; the smaller the moment of inertia, the faster the response speed of the speed-based PI controller.

The real-time speed V was measured by a speed estimating module, the signal of real-time speed V was processed by average filtering and recursive filtering to inhibit the speed fluctuation in a small range without affecting the response speed.

The reference speed Vref1 was acquired by a plurality of experiments.

The response time t1 of the speed-based PI controller was less than the response time t2 of the current-based PI controller; the response time t1 of the rotational speed-based PI controller was determined by the moment of inertia of the load; the greater the moment of inertia, the greater the response time t1 of the speed-based PI controller; the smaller the moment of inertia, the smaller the response time t1 of the speed-based PI controller, which ensured the response speed.

Figure 13:
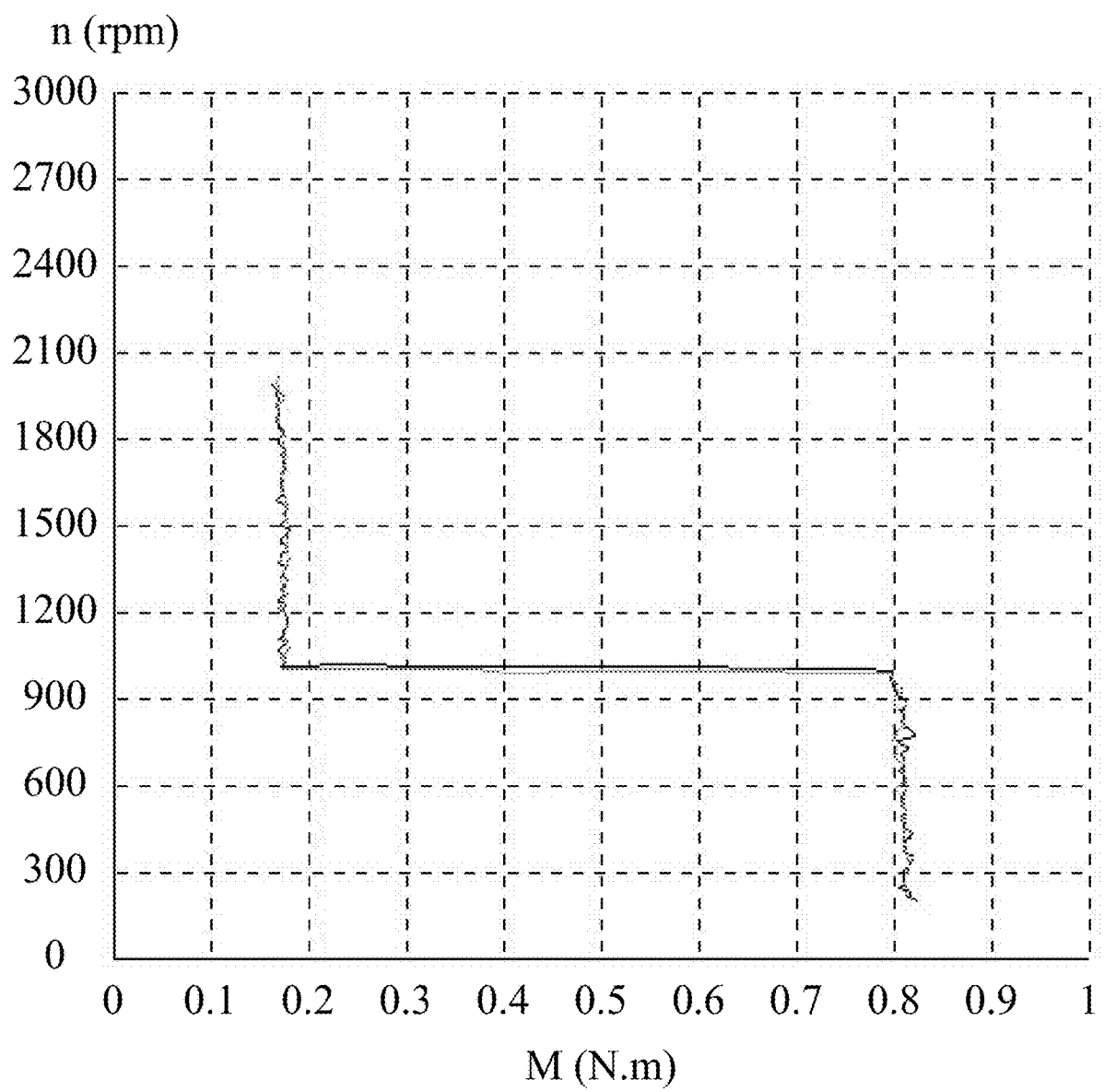
FIG. 13 is a schematic diagram showing the test results according to one embodiment of the disclosure.

As shown in FIG. 13, the ordinate was the speed of the motor, and the abscissa was the applied torque value. On a dynamometer, an automatic control and a manual loading were used to test the control strategy and the entry-exit mechanism. The experimental results showed that the speed was stably controlled within the range of a target value, and the control method can be smoothly switched between the two models. In FIG. 13, the result assumed that Vref1=Vref2=930 rpm, in the torque state, T=0.18 N·m and speed was 2000 rpm, the applied load increased from 0.18 N·m to 0.8 N·m and the motor maintained at a constant speed of 930 rpm.

Figure 12:
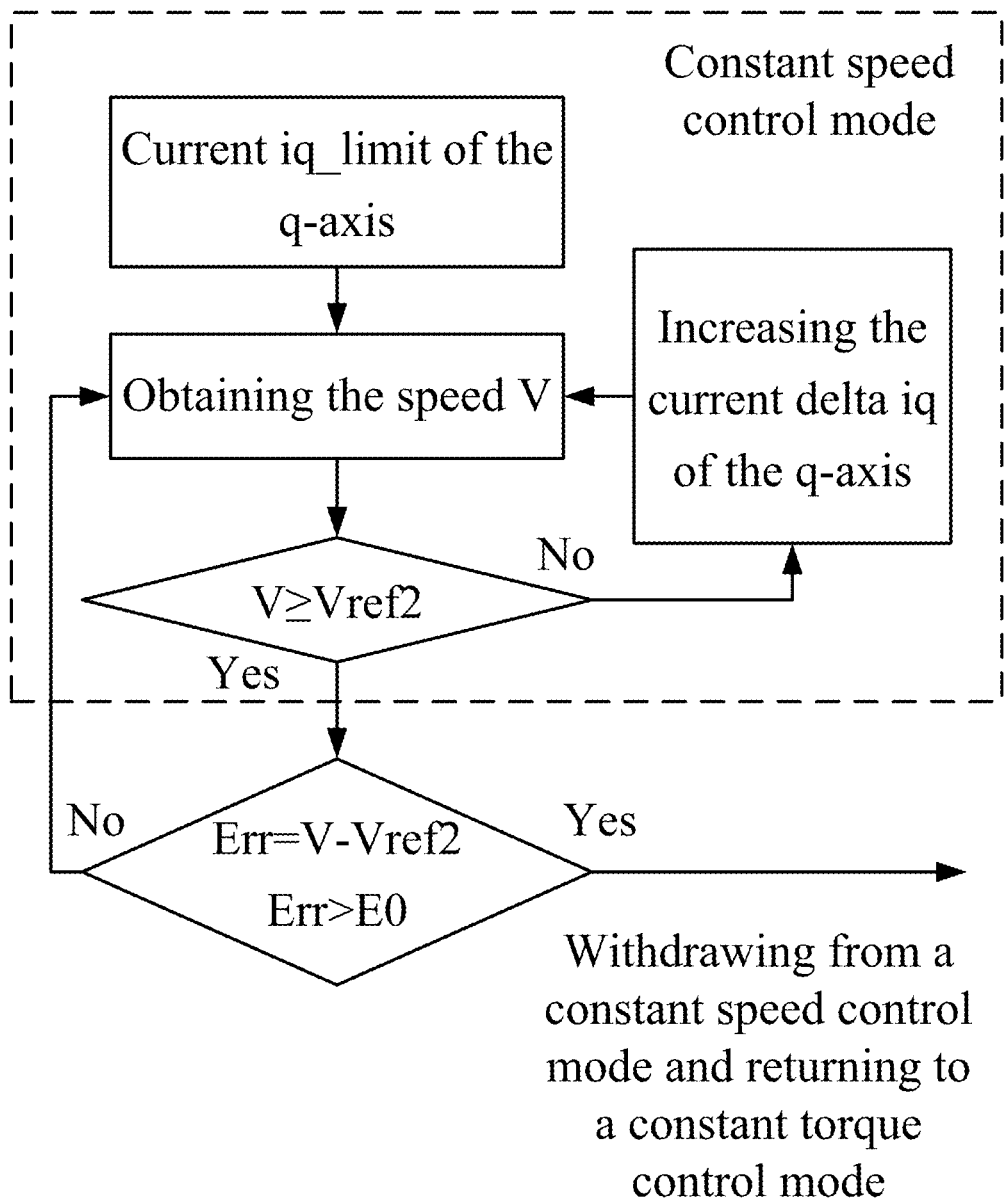
FIG. 12 is a flowchart showing a constant speed control in FIG. 10.
Figure 14:
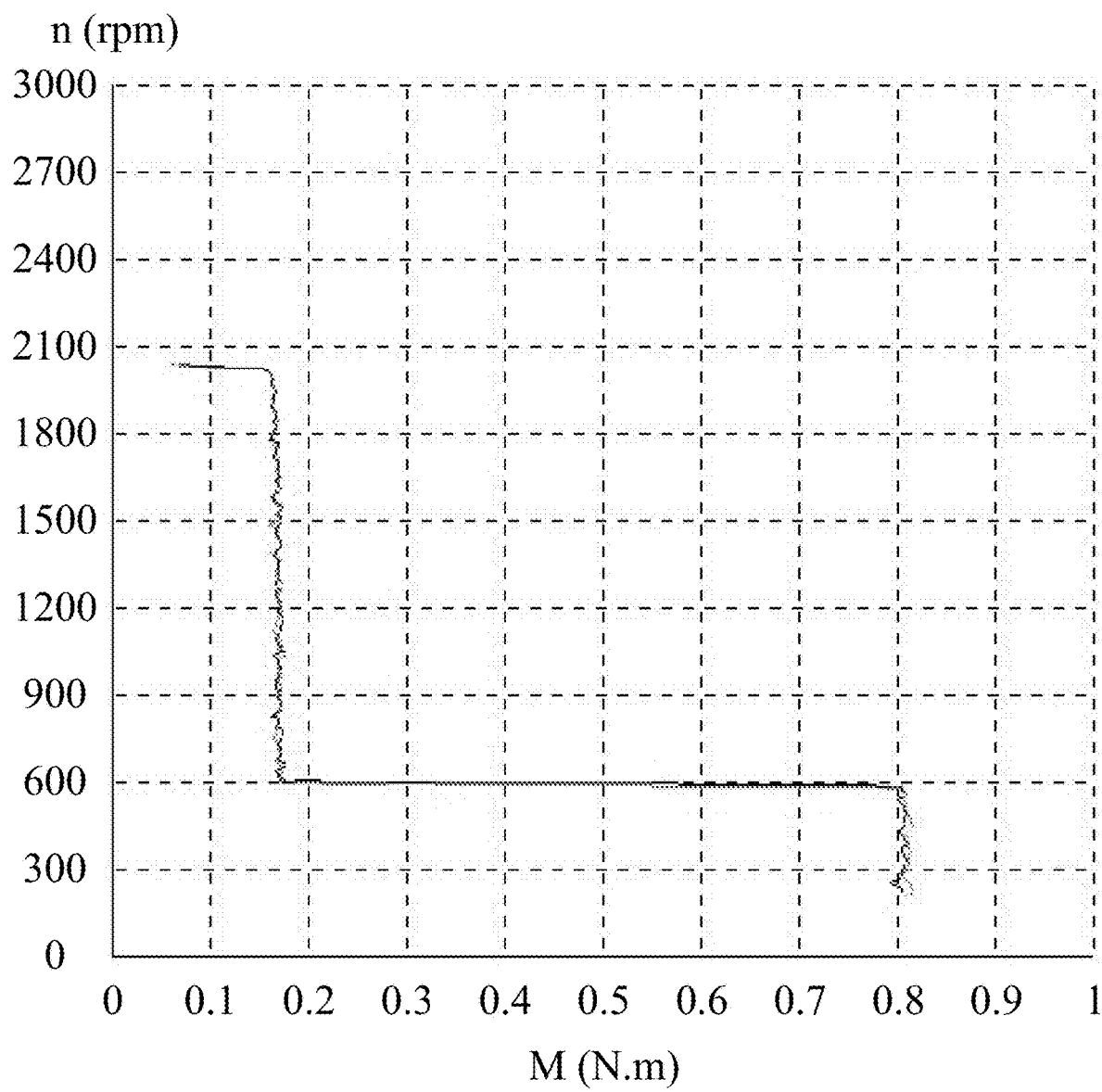
FIG. 14 is another schematic view showing the test results according to one embodiment of the disclosure.

As shown in FIG. 14, the ordinate was the speed of the motor and the abscissa was the applied torque value. On the dynamometer, the automatic control and manual loading were applied to test the control strategy and entry-exit mechanism. The experimental results showed that the speed was stably controlled within the range of a target value, and the control method can be smoothly switched between the two models. In FIG. 12, the experiment assumed that Vref1=Vref2=600 rpm, in the torque state, T=0.18 N·m and the speed was 2000 rpm, the applied load increased from 0.18 N·m to 0.8 N·m and the motor maintained at a constant speed of 600 rpm.

Figure 15:
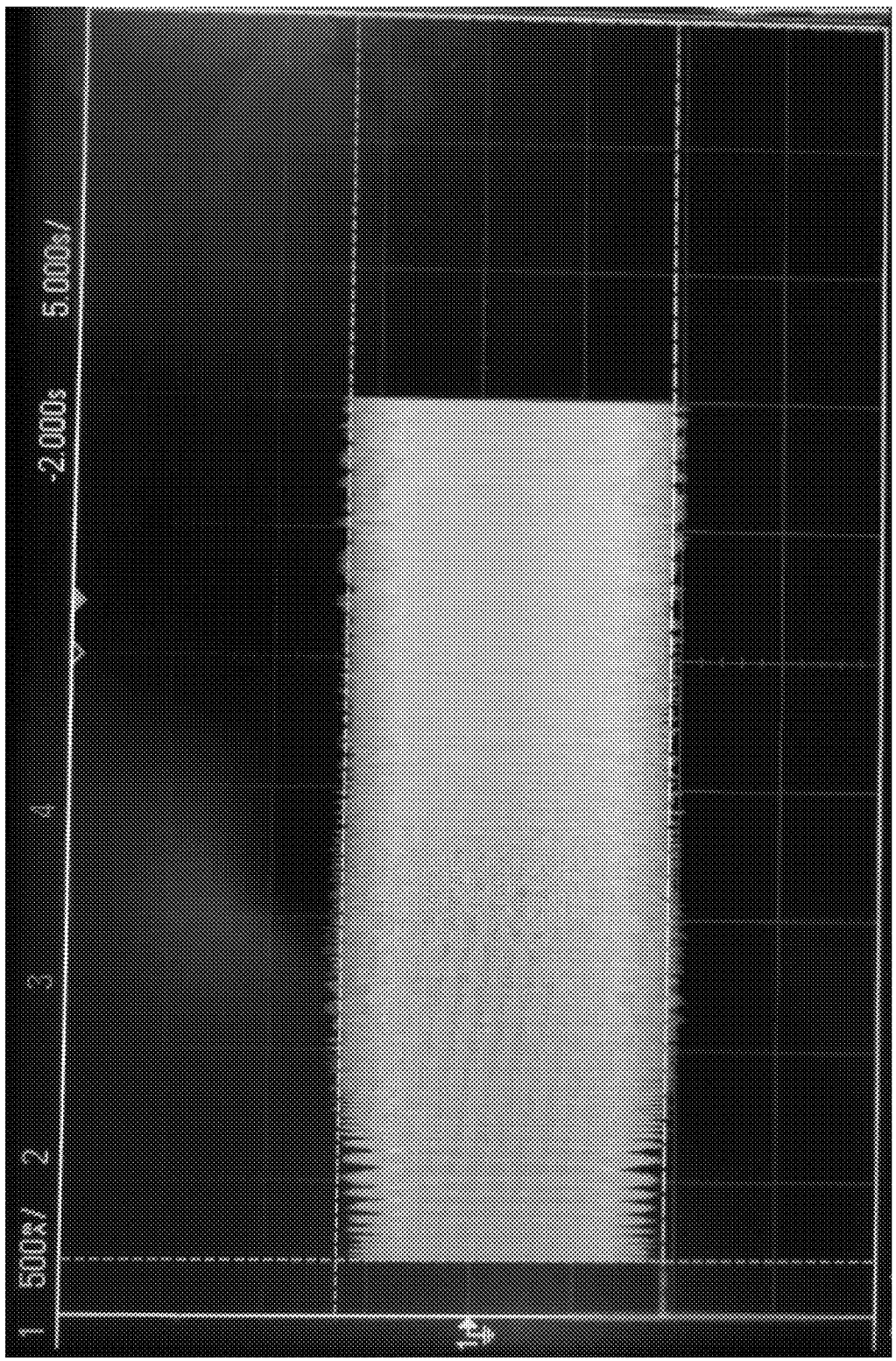
FIG. 15 is a schematic diagram of a current envelope during testing according to one embodiment of the disclosure.

As shown in FIG. 15, the load of a heavy-duty wind wheel was tested, and the experiment showed that the entire adjustment process was smooth. The lower part of the figure showed an adjustment process as the command value reduced. There was no obvious oscillation and abrupt change on the current envelope.

It will be obvious to those skilled in the art that changes and modifications may be made, and therefore, the aim in the appended claims is to cover all such changes and modifications.

What is claimed is:

1. A method, comprising:
    1) starting a motor; setting a torque T of the motor; calculating a given current iq_limit on a q-axis based on the torque T; setting a target current iq_A on the q-axis to be equal to the given current iq_limit; and allowing the motor to operate in a constant torque control mode by a current-based proportional integral (PI) controller on the q-axis;
    2) presetting a reference speed Vref1 of the motor; measuring a real-time speed V of the motor; when the real-time speed V is less than the reference speed Vref1, increasing an extra current delta_iq to the given current iq_limit to intervene the real-time speed V of the motor, so that the motor withdraws from the constant torque control mode and enters a constant speed control mode with a target speed Vref2; and
    3) measuring the real-time speed V of the motor; calculating a speed difference Err=V−Vref2; when the speed difference Err is greater than a given value $E_0$, allowing the motor to withdraw from the constant speed control mode and return to the constant torque control mode in 1).

2. The method of claim 1, wherein the reference speed Vref1=the target speed Vref2 or Vref1<Vref2.

3. The method of claim 2, wherein the given current iq_limit on the q-axis is calculated according to a formula T=K×iq_limit, where T is the preset torque of the motor, and K is a coefficient.

4. The method of claim 3, wherein the constant speed control mode is maintained by a speed-based PI controller disposed outside the current-based PI controller on the q-axis.

5. The method of claim 4, wherein when the speed difference Err is negative, the speed-based PI controller constantly acquires the extra current delta_iq of the q-axis; in the constant speed control mode, the target current iq_A is a sum of the given current iq_limit and a plurality of extra currents delta_iq of the q-axis.

6. The method of claim 5, wherein whether or not the speed-based PI controller quits a working mode is determined by the speed difference Err; when the speed difference Err is larger than a preset value $E_0$ which is greater than 0, the speed-based PI controller quits the working mode.

7. The method of claim 6, wherein the real-time speed V is measured by a speed observer; a signal corresponding to the real-time speed V is processed by average filtering and recursive filtering to inhibit a speed fluctuation.

8. The method of claim 7, wherein the reference speed Vref1 is acquired by a plurality of experiments.

9. The method of claim 7, wherein a response time t1 of the speed-based proportional integral controller is less than a response time t2 of the current-based proportional integral controller; the response time t1 of the speed-based proportional integral controller is determined by a rotational inertia of a load connected to the motor, and the response time t1 of the speed-based proportional integral controller is proportional to the rotational inertia of the load.

* * * * *